United States Patent [19]

Frazer

[11] 4,321,299

[45] Mar. 23, 1982

[54] STRONG THIN MEMBRANE STRUCTURE FOR USE AS SOLAR SOIL COMPRISING SUBSTRATE WITH REFLECTIVE COATING ON ONE SURFACE AND AN INFRA RED EMISSIVITY INCREASING COATING ON THE OTHER SURFACE

[76] Inventor: Robert A. Frosch, Administrator of the National Aeronautics and Space Administration, with respect to an invention of Robert E. Frazer, La Canada, Calif.

[21] Appl. No.: 106,188

[22] Filed: Dec. 21, 1979

Related U.S. Application Data

[63] Continuation-in-part of Ser. No. 833,636, Sep. 15, 1977, abandoned.

[51] Int. Cl.$^3$ .................... B05D 5/00; B05D 5/06; B32B 15/08; B32B 31/12; B32B 33/00
[52] U.S. Cl. .................................. 428/247; 156/176; 156/233; 156/247; 156/281; 427/50; 427/160; 427/209; 427/250; 427/251; 427/255.5; 427/255.7; 427/290; 427/296; 427/307; 428/255; 428/446; 428/451; 428/458; 428/461; 428/473.5; 428/477.7; 428/480; 428/523
[58] Field of Search .............. 428/247, 412, 446, 448, 428/451, 458, 461, 469, 472, 474, 473.5, 477.7, 523, 480; 156/176, 233, 247, 281; 427/50, 160, 209, 250, 251, 290, 296, 307, 248 G, 248 J, 255.5, 255.7

[56] References Cited

PUBLICATIONS

Chemical Abstracts, 89, 25624G.
J. Polym. Sci. Polymer Symposium No. 62, "Electra and Photoresponsive Polymers", Polytech, Inst. of New York, N.Y., (1977).

*Primary Examiner*—James C. Cannon
*Attorney, Agent, or Firm*—Paul F. McCaul; John R. Manning

[57] ABSTRACT

Production of strong lightweight membrane structure by applying a thin reflective coating such as aluminum to a rotating cylinder, applying a mesh material such as nylon over the aluminum coating, coating the mesh overlying the aluminum with a polymerizing material such as a para-xylylene monomer gas to polymerize as a film bound to the mesh and the aluminum, and applying an emissivity increasing material such as chromium and silicon monoxide to the polymer film to disperse such material colloidally into the growing polymer film, or applying such material to the final polymer film, and removing the resulting membrane structure from the cylinder. Alternatively, such membrane structure can be formed by etching a substrate in the form of an organic film such as a polyimide, or a metal foil, to remove material from the substrate and reduce its thickness, applying a thin reflective coating such as aluminum on one side of the substrate and applying an emissivity increasing coating such as chromium and silicon monoxide on the reverse side of the substrate.

39 Claims, 6 Drawing Figures

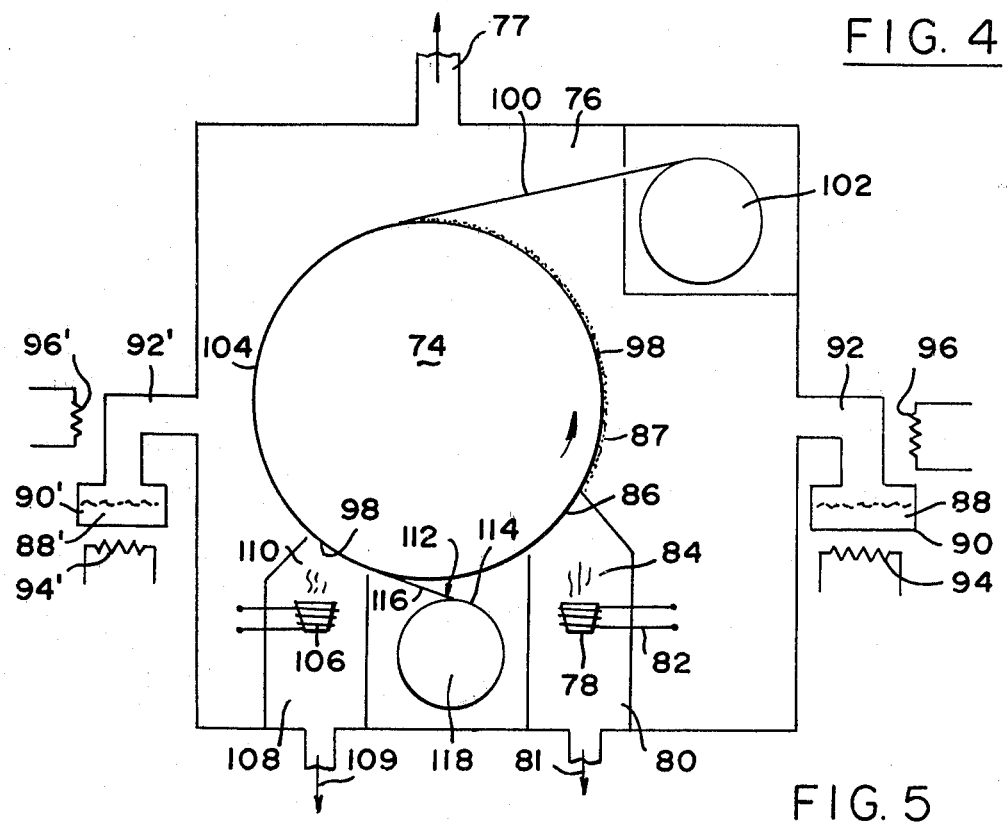
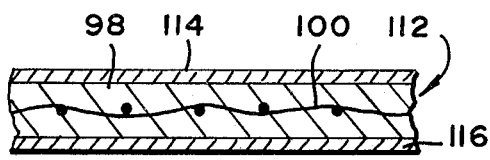
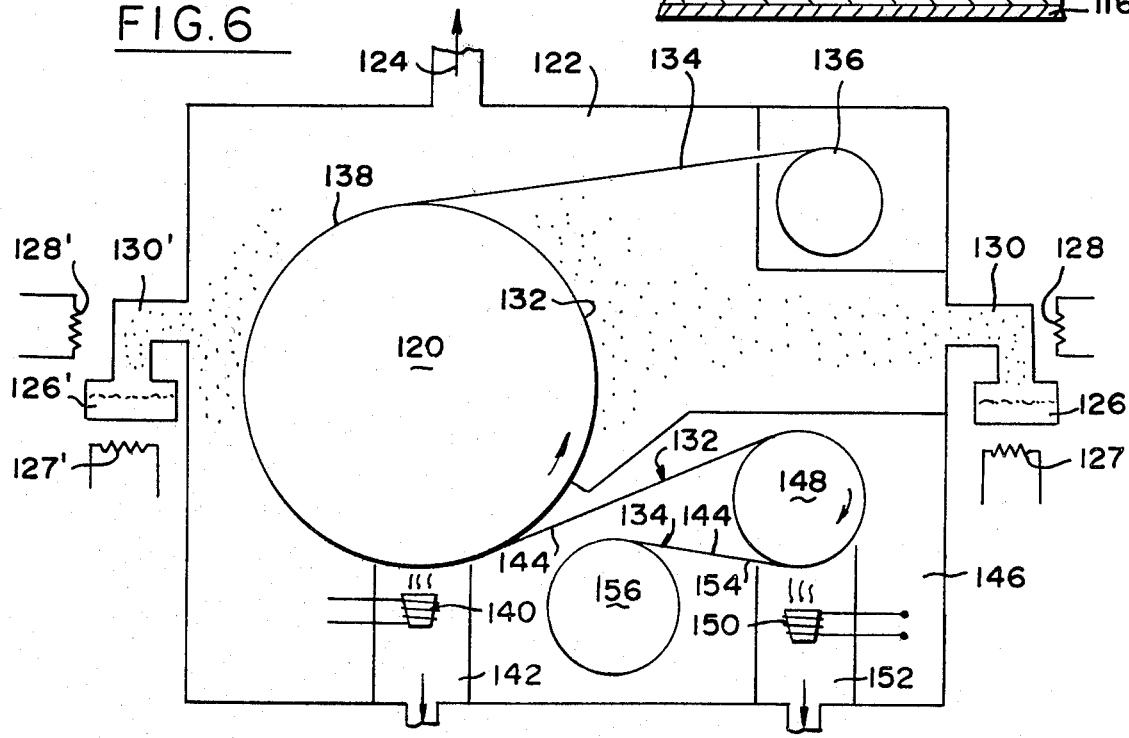

STRONG THIN MEMBRANE STRUCTURE FOR USE AS SOLAR SOIL COMPRISING SUBSTRATE WITH REFLECTIVE COATING ON ONE SURFACE AND AN INFRA RED EMISSIVITY INCREASING COATING ON THE OTHER SURFACE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

CROSS-REFERENCE TO RELATED APPLICATION

This application is a continuation-in-part of copending application Ser. No. 833,636 filed Sept. 15, 1977, now abandoned.

BACKGROUND OF THE INVENTION

1. Field of the Invention

This invention relates to production of thin, strong, lightweight membrane structures, particularly useful as solar sails for propulsion of spacecraft by radiation pressure, and is particularly concerned with a continuous process for producing such structures and with the novel composite membranes thus produced.

2. Description of the Prior Art

Large solar sails propelled by solar pressure can be used for propelling vehicles in space. A requirement for producing such solar sails is that the sail be in the form of a thin membrane that can be fabricated into membranes of large area, yet which are strong and lightweight, and capable of long endurance in the space environment. Such membranes or sails should also be constructed so that means for imparting some stiffness to the sail can be applied thereto to facilitate erecting the sail in the space environment.

Although many prior art processes have been developed for producing thin organic as well as metal membranes, the continuous production of thin lightweight membranes having the above characteristics and which are particularly valuable for use as solar sails have not been suggested or disclosed.

SUMMARY OF THE INVENTION

The invention provides a process for continuously fabricating thin strong lightweight membrane structures particularly adapted for use as solar sails.

Broadly, this is accomplished by forming a thin continuous substrate, applying a reflective coating on one side of said substrate and applying an emissivity increasing film or coating on the opposite side of said substrate.

According to one embodiment, a substrate such as a thin organic film or metal foil is subjected to masking and etching, particularly ion etching, to provide weight reduction and selective thinning of the substrate or membrane. A highly reflecting coating such as aluminum is applied on one side of the membrane or substrate and an emissivity enhancing coating is applied on the other or reverse side of the substrate.

In another embodiment of the invention, a thin film of highly reflecting coating such as aluminum is applied, e.g. by evaporation, to a cylinder, which is preferably highly polished, and a reinforcing mesh such as nylon is applied over the aluminum coating. The mesh overlying the aluminum is coated with a polymer forming material such as para-xylylene monomer gas which polymerizes as a film bound to the mesh and the aluminum, the cylinder being cooled to increase the growth rate or thickness of the polymer. An emissivity increasing material, e.g. chromium or silicon monoxide, is applied to the polymer film. Such emissivity enhancing material can be applied as the polymer film increases in thickness and such material becomes colloidally dispersed in the polymer. Alternatively, such material can be subsequently applied to the polymer coating after complete deposition thereof, to form a surface film of the emissivity increasing material.

The processes of each of the above embodiments can be carried out in a completely continuous manner, the resulting thin strong lightweight membrane structures or composites being wound on a take-up roll.

DESCRIPTION OF PREFERRED EMBODIMENTS

As previously noted, a first means for producing a lightweight membrane according to the invention involves the use of etching, particularly of "ion etching" of a polymer substrate or a thin metal foil to initially reduce the thickness of the substrate. Such etching is applicable to a thin organic or polymeric film, either thermoplastic or thermosetting, such as polyolefin, e.g. polyethylene, polyarylenes, e.g. poly (para-xylylene), polyester, e.g. the material marketed as Mylar, polyimide, e.g. the material marketed as Kapton, polyamide, e.g. nylon, polycarbonate, and the like. Such etching is also applicable to a metal foil such as aluminum, titanium and gold. The method involves the use of oxygen, a heavy ion such as argon, or mixtures of argon and oxygen, bombarding the surface of the substrate at a suitable energy level, using a few, e.g. 1-10 KV of energy. This treatment displaces material from the substrate at rates which are a function of the angle of incidence, the energy of the ions, and the substrate material. For metal substrates, the etching rates tend to increase with high atomic weight of the metal. With polymers the rate may also be a function of the presence of reactive gases. Oxygen, for example, enhances the removal of certain polymers such as those noted above. In practice, these etch rates are compatible with methods for processing long continuous webs of substrates.

Other etching methods also can be employed such as ion beam etching, employing a directed beam of ions or atoms generated in a confined space in high concentration at relatively high pressure. Another alternative etching means is the technique known as "plasma etching." This method involves the generation of an undirected plasma at reduced pressure in a DC or AC field or in a confined zone surrounded by a strong external RF field. Thus, highly reactive species can be created in such zone or chamber as by the breaking down of fluorocarbons under these conditions to yield fluorine ions. Similarly mixed ion species can be produced from combinations of starting materials.

Also, with respect to metal substrates such as for example, an aluminum foil, chemical etching can be employed, as is well known in the art, such as the use of alkali solutions, to reduce the thickness of the foil.

Thus, a continuous web of the organic or metal film can be etched by any of the means noted above, and then processed to receive a highly reflecting coating on one side of the substrate and an emissivity enhancing coating on the reverse side thereof, according to the invention. According to a preferred embodiment employing ion etching, the continuous web moves through a vacuum chamber. If desired, the etching phase can be arranged to take place through a grid or mask moving with the substrate through the etch station so that the etching is confined to the open areas of the moving mask and the unetched masked areas remain at the original thickness, to provide a strengthening web. A group of organic materials such as polyimides and polyvinyl alcohols, commonly employed as photo resists, are known to be cross-linked by the action of light and electron beams. If such a photo resist is coated on the substrate, a strengthening pattern can be traced on the substrate by light or by an electron beam acting upon the material passing through the vacuum system at the etching station.

For strengthening purposes, the substrate can contain reinforcing materials, including refractory materials such as carbon fibers or filaments, boron fibers, silica fibers, and the like, or non-refractory materials such as nylon, e.g. in the form of a mesh, embedded in the polymer substrate.

Following the etching step, a highly reflective coating is applied to one side of the substrate. Reflective coatings of aluminum are particularly effective, but other highly reflective materials such as silver, gold (for infra-red reflectance), and the like, can be used. The metal can be applied as a thin coating on the substrate by various means such as thermal evaporation, sputtering, ion plating, and vapor decomposition. Thermal evaporation is the preferred method for the deposition of reflective coatings of the preferred metal, aluminum. Thus, for example, aluminum can be evaporated by direct heating on a tungsten filament, or from a boat, which is under vacuum, or by R.F. heating or electron bombardment, the substrate being under vacuum at the coating station.

Following application of the highly reflective coating to one side of the substrate, the resulting coated continuous substrate is passed to another coating station, at which stage an emissivity increasing coating is applied to the opposite side of the substrate, preferred coatings of this type being chromium or silicon monoxide, and mixtures thereof. The type of emissivity referred to herein is infra-red emissivity. Thus, the emissivity which is increased according to the invention is in the infra-red region. In place of chromium and silicon monoxide other infra-red emissivity increasing materials such as metals, metals oxides and metal sulfides can be used, e.g. lead, copper, tin, cobalt, iron, vanadium, copper oxide, chromium oxide, copper sulfide, lead sulfide, and mixtures thereof, particularly mixtures of such metals and metal oxides. Also, metal alloys such as nichrome or inconel (nickel-iron-chrome alloys), and carbon can be employed. The infra-red emissivity increasing coating is applied as a thin film to the substrate surface. This can be accomplished by various means such as thermal evaporation, R.F. sputtering, gas phase decomposition, and the like, or combinations thereof.

The order of application of the reflective and emissivity coatings to the substrate can be varied so that one or the other can be applied first, and the other second, or both can be applied to opposite sides of the substrate substantially simultaneously.

Thus, both surfaces of the substrate, e.g. polymer substrate, can be coated in the same system such as a vacuum chamber, in two passes, or simultaneously on opposite surfaces of the continuous web. The final membrane structure is in the form of a thin strong lightweight membrane of a thickness ranging from about 0.1 micron to any desired thickness, e.g. up to 100 microns or more, and which is flexible. Membranes of this type are particularly applicable for producing large area solar sails of hundreds of square meters in area, for propulsion of spacecraft by radiation pressure.

Another preferred mode of precedure for producing such membranes or films, involves the use of a family of organic polyarylene materials, particularly related to poly (para-xylylene), having the property of producing continuous highly stable polymer films on a room temperature or a cooled substrate, when the gas phase monomer, such as para-xylylene, monochloro-paraxylylene, or dichloro-paraxylylene, is released into a vacuum enclosing the substrate to be coated. In this method, the starting material is the dimer of the above materials, which is vaporized and cracked or pyrolyzed in a heated retort communicating with the work chamber, to form the monomer. The monomer is then deposited at substantially room temperature, e.g. on a rotating drum, or on a reflective, e.g. aluminum, film formed on such drum, to form the continuous membrane.

The resulting films are stable at high temperatures, up to 300° C., in a vacuum. In this respect such films are comparable to polyimide, polyester, polycarbonate, or polyethylene films. The poly (para-xylylene) films deposited as noted above also have desirable properties of flexure, moisture absorption and low temperature strength.

Further, the growth of the films deposited by the above noted procedure is readily controllable and reproduceable by varying the parameters of monomer pressure, substrate temperature and exposure time. Films as thin as 0.1 microns or as thick as 20 to 30 microns can be readily deposited and removed from the substrate surface on which they are deposited, as free standing films. Such films will readily accept a full range of reflective coatings including aluminum and silver, and emissivity control coatings such as chromium and silicon oxides, as required.

A conducting metal, carbon or polymer filament mesh held in contact with the substrate during deposition of the polymer film as described above, can also be coated and embedded in the polymer film to provide reinforcing, rip-stop, and/or charge distribution capability.

A continuous production sequence for producing thin membrane structures according to this embodiment can be carried out in the following manner. A highly polished cooled drum or cylinder treated with a parting or release agent, such as a silicone or polyethylene glycol, is coated with a thin film of highly reflective substance such as aluminum as by evaporation in a vacuum, in the manner previously pointed out. At a further point in its rotation, a mesh, e.g. in the form of nylon with wide spacing, is placed over the aluminum film. At a further point in the rotation of the cylinder, the mesh overlying the aluminum is exposed to para-xylylene (parylene) monomer gas, which polymerizes as a film in contact with and bound to the mesh and the aluminum film, This portion of the cylinder may be cooled to increase the local growth rate of the polymer film. After further rotation, when the film has attained sufficient thickness, the emissivity increasing film, e.g. chromium, is applied as by R.F. sputtering or other conventional means, to the opposite side of the polymer from the aluminum coating. The emissivity enhancing coating can be applied as the polymer film increases in thickness and under these conditions the emissivity increasing material such as chromium, is finely dispersed or colloidally dispersed in the polymer. However, such emissivity increasing materials can be applied following complete deposition of the polymer coating, to form a surface emissivity increasing film on the polymer coating.

Alternatively, carbon can be deposited as an emissivity controlling film, by evaporation on the completed polymer film or colloidally dispersed in the growing film. Such carbon can be deposited by sputtering or by evaporation as a coating from heated bulk material or by the decomposition of a hydrocarbon gas such as methane, benzene, and the like.

In still another alternative, the poly (para-xylylene) film can be initially deposited on a cooled drum from the monomer while embedding a reinforcing mesh during such polymerization, and the emissivity increasing and reflective coatings applied thereafter on opposite sides of the polymer film.

The finished thin membrane structure in the form of a poly (para-xylylene) membrane having a high reflecting surface on one side and an emissivity increasing film on the other side, and containing a reinforcing mesh, can be removed from the drum at this stage and wound on a take-up roll.

Instead of employing the above noted parylene monomer for polymerization of a polymer film as noted above, an alternative procedure is to form a polymer coating such as polyimide by the polymerization of a two-component system, such as the reactants pyromellitic dianhydride and an aromatic diamine. The vaporized components can be released into a vacuum chamber and condensed stoichiometrically onto a cooled substrate. During condensation or immediately thereafter, the deposited components can be bombarded with electrons or ions to induce polymerization as a thin film. A reinforcing mesh such as graphite or boron fibers can be embedded in the coating during polymerization. The film thus formed can then accept reflective and high emissivity coatings on opposite surfaces thereof, as previously described, and can then be stripped from the substrate drum or belt.

As an optional feature, a carrier or support film e.g. a polymeric film such as an acrylic film, can be applied as a temporary support for the polymer or metal substrate, the carrier being subsequently removed by ultraviolet radiation from the sun when the solar sail is erected in space. In this respect, referring to the first mode of procedure employing the etching technique, the carrier is first placed into contact with the substrate, e.g. polymer substrate, followed by application of the reflective and emissivity coatings thereto, and the resulting coated polymer substrate with the carrier in contact therewith taken up on a roll.

With respect to the other embodiment of the invention process described above, the carrier or support can first be deposited on the polished cylinder, followed by application of the aluminum film thereto, the placement of the mesh over the aluminum, the application of the polymer coating as by polymerization employing a parylene monomer, and finally, application of the emissivity coating onto the polymer coating.

After erection of the solar sail in space, as previously noted, the carrier or support film is subjected to UV radiation from the sun, destroying the polymer bonds of the carrier and leaving the lightweight thin strong substrate or membrane structure after sublimation of the carrier film.

The invention will be more clearly understood by the detailed description below, taken in connection with the accompanying drawing wherein:

FIG. 4 illustrates another embodiment of the invention process, showing formation of the polymer substrate employing para-xylylene monomer;

FIG. 5 is a longitudinal section of the substrate produced in the process of FIG. 4; and FIG. 6 is a modification of the process illustrated in FIG. 4, wherein the coating is first formed on the drum, and the emissivity and reflective coatings thereafter applied, in the same chamber.

Figure 1:
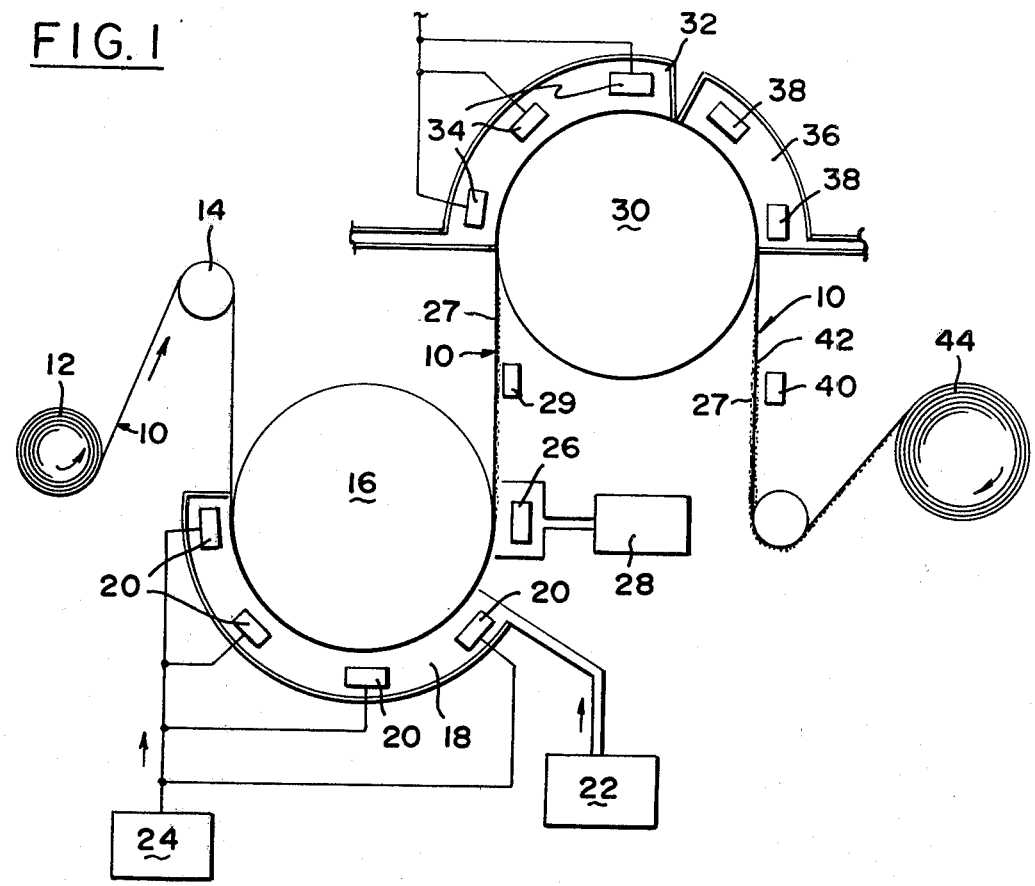
FIG. 1 illustrates thin membrane fabrication in a vacuum system according to the invention process, employing etching of the substrate.

Referring to FIG. 1, numeral 10 illustrates a substrate film such as a polyimide, fed from a supply spool 12 by way of an idler roll 14, around a cooled work roll or cylinder 16. As the film 10 passes through the underside of roll 16, it passes through an ion etching chamber 18 containing plural, here shown as four, etch stations 20. An etching gas such as oxygen or a mixture of oxygen and argon, is fed from an etching gas supply 22 to the etch chamber 18, and ion etching power is supplied at 24 by DC or RF energy. A plurality of etch stations is preferred in order to etch the film substrate 10 to a desired reduced thickness as the substrate continues to pass under the roll from the first etch station to the last etch station as the roll or drum rotates in a counter-clockwise manner.

After etching of the substrate has been completed at the last etch station 20 to the right, viewing FIG. 1, the substrate 10 is coated at station 26 with an emissivity increasing coating 27 such as chromium by sputtering, employing a sputter gas supply 28.

After a suitable thickness of emissivity increasing coating has been applied, as monitored at station 29, the coated film 10 then passes over the top of a cooled work roll 30 and through a second etch chamber 32 containing three etch stations 34, operating in the same manner as etch chamber 18 and the etch stations 20 therein. After a predetermined amount of additional etching of substrate 10 on the side opposite the emissivity increasing coating 27, the further thinned substrate passes through another coating chamber 36 containing two coating stations 38, at which stations aluminum is evaporated in a vacuum onto the previously etched opposite side of substrate 10, to form a reflective aluminum coating 42. At coating stations 26 and 38, sufficient power or energy is supplied for sputtering and evaporation of the chromium and aluminum, respectively. The thickness of the aluminum coating is monitored at station 40 and the continuously moving web 10 of etched thin membrane having an aluminum coating 42 on one side thereof and an emissivity increasing coating 27 on the opposite side, thereof is taken up on a take-up spool 44. The thickness monitored at stations 29 and 40 creates a signal which controls the rate of deposition of the emissivity control and reflective coatings 27 and 42, respectively.

If desired, the polyimide substrate film 10 can have a reinforcing mesh embedded therein.

It will be understood that a single etching station of suitable size can be used in place of the plural etch stations 22 and/or 34.

Figure 2:
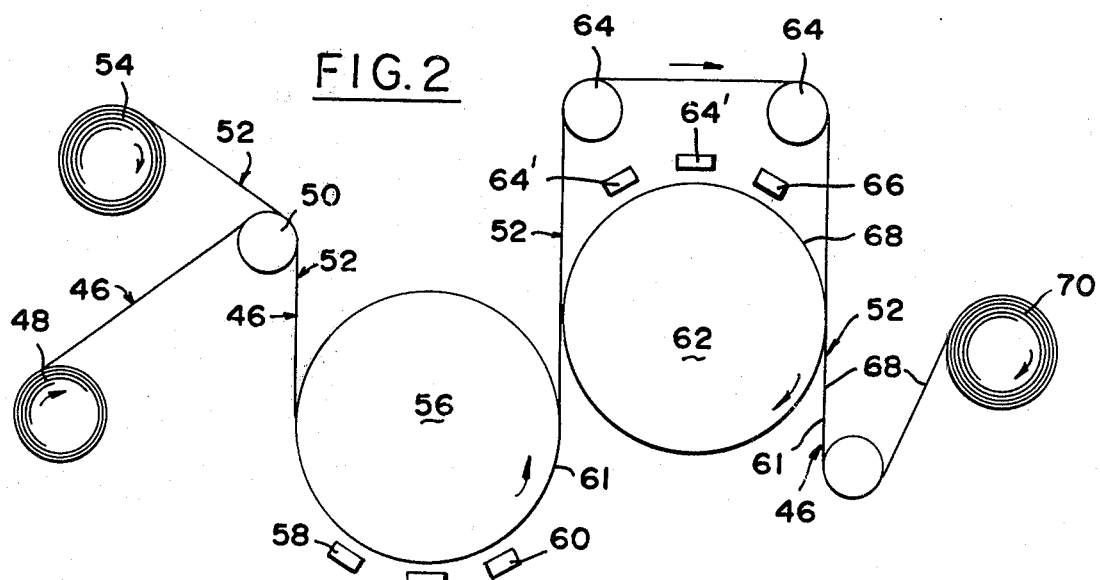
FIG. 2 illustrates an embodiment similar to FIG. 1, but employing a protective support film.

Referring to FIG. 2, there is illustrated an embodiment similar to FIG. 1, but including the use of a protective support film. In FIG. 2, a polyimide (Kapton) film 46 is fed from a supply spool 48 over an idler roll 50 into contact with a protective support film 52, formed of acrylic resin, which is fed from a supply spool 54, the support film 52 being applied over the substrate film 46 around the idler roll 50.

The composite of substrate film 46 and support film 46 and support film 52 are continuously fed around the underside of a cooled work roll 56 rotating counter-clockwise, and the outside of substrate 46 is etched by ion etching at etch stations 58 in the manner noted above with respect to FIG. 1. Following etching to the predetermined thickness of the substrate 46, the composite film 46, 52 passes to a coating station 60, at which station an emissivity increasing material such as chromium is applied as by sputtering, onto the outer exposed surface of the substrate 46, to form the emissivity increasing coating 61.

Shortly after the composite films 46 and 52 leave the roll 56, the substrate film 46 is parted from the support film 52, the former passing over the upper portion of the work roll 62, which rotates clockwise, with the emissivity control coating 61 in contact with the roll, and the support film 52 passing overhead, around idlers 64. As the substrate 46 passes around the upper periphery of the roll 62 it is first etched on its outer side at etch stations 64', by ion etching as previously described, to further reduce the thickness of the polyimide film, after which the film 46 passes coating station 66. At 66 a reflective material such as aluminum is evaporated and deposited at 68 onto the outer surface of the substrate 46. Just as the resulting substrate 46 containing the emissivity increasing coat 61 and the reflective coat 68 leave the work roll 62, the protective film 52 comes into contact with the outer surface of substrate 46 adjacent the reflective coating 68 thereon, and the composite substrate 46, containing the emissivity increasing and reflective coatings 61 and 68, and the support film 52 are wound onto a take-up roll 70.

Figure 3:
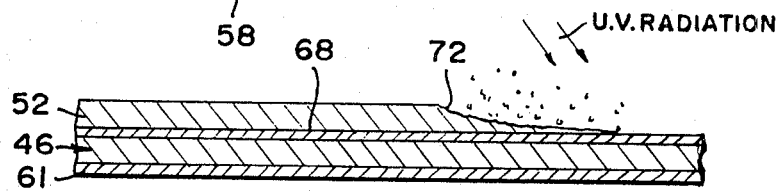
FIG. 3 is an enlarged longitudinal section of the composite thin substrate produced by the process illustrated in FIG. 2, containing reflective and emissivity increasing coatings and the attached support film, and the removal of the support film by UV radiation.

In FIG. 3, is shown a longitudinal section of the composite substrate 46 and support film 52, the substrate containing the aluminum reflective coating 68 on its outer surface adjacent the support film 52, and the emissivity control coating 61 on its opposite surface.

For producing solar sails having a large area, it is generally necessary to join the thin membrane structure 10 formed in FIG. 1, or the thin composite membrane structure 46, 52 formed in FIG. 2, containing reflective and emissivity increasing coatings, to other like membranes. This can be achieved in any suitable manner by a joining process such as by sewing or bonding.

When the composite membrane structures 46, 52 are so joined together and erected in space to function as a solar sail, the support or carrier film 52 is degraded into polymer fractions and vaporized, as shown at 72 in FIG. 3, by the impingement of UV radiation from the sun, leaving the solar sail, formed of the polyimide film 46 and the emissivity increasing and reflective coatings 61 and 68, respectively, thereon.

Although the support fiber 52 is shown adjacent the aluminum reflective coating 68 of the composite membrane structure 46, 52 in FIGS. 2 and 3, the support film 52 alternatively can be positioned adjacent the emissivity control coating 61.

FIG. 4 illustrates another embodiment of the invention process utilizing para-xylylene monomer for producing the polymer substrate. A parting agent such as a silicone oil is applied to the highly polished surface of a rotating cylinder 74 within a chamber 76, evacuated by a connection 77 to a vacuum pump (not shown). Aluminum is placed in a boat 78 within a housing 80 in chamber 76, housing 80 also being evacuated via conduit 81. The boat 78 is electrically heated at 82 to cause the aluminum to vaporize at 84 and such vapors impinge on the counter-clockwise rotating surface 86 of the drum 74, to form a thin film of aluminum 87 thereon.

A source of di-para-xylylene (dimer) at 88 is placed within a pyrolyzer heater 90 which communicates with the vacuum chamber 76 via a conduit 92. The source heater 94 heats the dimer to about 175° C. to vaporize it, the vapors of which are then heated by the pyrolyzer heater 96 to a temperature of about 680° C. to pyrolyze the dimer and form para-xylylene (monomer) vapor. The pressure for these reactions is maintained at between about 1 and about 0.5 torr. The monomer gas passes through conduit 92 into the chamber 76 and impinges onto the aluminum film 87 previously deposited on the rotating cyliner, to form poly (para-xylylene), the polymer coating 98.

A nylon or refractory mesh 100 having relatively wide spacing is fed from a mesh supply roll 102 onto the polymer coating 98 as it continues to grow in thickness during continued counter-clockwise rotation of the drum and becomes embedded in the coating.

Diametrically opposite the pyrolyzer heater 90, is a second pyrolyzer heater 90' containing a source of dimer 88' which is similarly vaporized and pyrolyzed at 94' and 96', respectively, to form monomer vapors passing through conduit 92' and impinging on the previously formed polymer coating at 104 to polymerize and increase the thickness of the coating 98 on the drum and completely cover the mesh 100 embedded in the coating. The cylinder or drum 74 can be cooled by suitable means (not shown) to increase the growth rate of the polymer coating 98.

As the drum 74 continues to rotate counter-clockwise, chromium contained in a boat 106 within a second housing 108 differentially evacuated via conduit 109, in the chamber 76, is electrically heated to vaporize the chromium, the chromium vapors 110 impinging on the outer surface of the polymer coating 98 to form an emissivity enhancing coat 116. The resulting composite membrane 112 formed of the para-xylylene polymer coating 98 with the mesh 100 embedded therein and having a reflective aluminum coating 114 on one side thereof and an emissivity enhancing chromium film 116 on the opposite side thereof is wound on a product take-up roll 118. A longitudinal section of the thin strong membrane structure 112 is shown in FIG. 5.

In FIG. 6 there is shown a modification of the process illustrated in FIG. 4, wherein the polymer film is grown and reinforced on the drum, and then coated on opposite sides with reflective and emissivity increasing films within the same chamber.

Thus, drum 120, cooled by suitable means (not shown), is mounted within a chamber 122 which is evacuated by connection at 124 to a vacuum pump (not shown). Para-xylylene dimer at 126 is vaporized by heater 127 and pyrolyzed by the pyrolyzer heater 128, and the resulting monomer vapors pass through conduit 130 into the vacuum chamber 122, and impinge on the surface of the cooled drum to form a polymer coating 132 thereon. As the drum rotates counter-clockwise, a nylon reinforcing mesh 134 fed from a supply roll 136 is passed into contact with the growing polymer film on the drum and at the diagonally opposite side of the drum from the pyrolyzer heater 128 is a second heater 127' and a second pyrolyzer heater 128' which vaporizes and pyrolyzes a dimer source 126', forming monomer gas passing through conduit 130' into contact at 138 with the previously formed polymer coating 132 and the mesh 134 thereon, to increase the thickness of the substrate forming coating 132 and embed the reinforcing mesh therein.

As the drum continues rotating counter-clockwise with the coating 132 adjacent the bottom thereof, chromium in an electrically heated boat at 140 within differentially evacuated housing 142 in chamber 122, is vaporized, and the chromium vapors impinge against the outer surface of the mesh-containing substrate 132 to form a thin emissivity enhancing coat 144 on the outer surface of the substrate 132. The resulting coated substrate passes into a second differentially pumped housing 146 within chamber 122, and around the upper surface of a cooled drum 148 therein, with the emissivity enhancing coating 144 in contact with the surface of such drum. As this drum rotates clockwise, the outer surface of the substrate 132, as it passes around the lower periphery of the drum, is subjected to contact by aluminum vapors derived from an electrically heated boat 150 containing aluminum, and which is disposed in an auxiliary evacuated housing 152 within the baffled housing 146. A thin reflective aluminum coating 154 is formed on the polymer substrate 132 on the opposite side thereof from the emissivity enhancing coating 144. The resulting thin strong membrane structure formed of the polymer 132 containing the nylon mesh 134, with the reflective and emmissivity increasing coatings 154 and 144, respectively thereon, is wound on a product take-up roll 156. This membrane structure has the same composition as that illustrated in FIG. 5.

When using the flexible membrane structures produced according to the invention and joined together to form a solar sail, as previously described, various methods can be employed for erection of the sail in space. For this purpose, the membrane can be rigidized in various ways. Thus for example, the rear surface of the membrane, away from the sun, can be fabricated with an array of tubes which can be inflated during the erection operation. The inflation of these tubes provides shape and added strength to the sail panel. If desired, after inflation, the initial inflating gas can be displaced by the monomer gas from a para-xylylene pyrolyzer as described above. Such monomer gas can be diffused through the tubes and as the gas contacts the walls of the network tubes, it polymerizes to leave behind the rigid lining in the supporting array.

Although the procedures of the invention are particularly applicable for production and fabrication of thin strong membrane structures especially adapted for use as solar sails, such methods can be employed for producing membranes useful as osmotic membranes in water and blood purification, as capacitor dielectrics, as space orbiting collectors for solar energy, and other applications.

While I have described particular embodiments of the invention for the purpose of illustration, it will be understood that various changes and modifications can be made therein within the spirit of the invention, and the invention accordingly is not to be taken as limited except by the scope of the appended claims.

What is claimed is:

1. A thin lightweight membrane structure comprising a substrate consisting of a thin flexible organic film or metallic foil containing a reflective coating on one side of said substrate and an emissivity increasing coating on the opposite of said substrate.

2. A thin lightweight membrane structure comprising a substrate consisting of a thin flexible organic film or metallic foil containing a reflective coating on one side of said substrate and an infra-red emissivity increasing coating on the opposite side of said substrate.

3. The membrane structure as defined in claim 2, said substrate being a thin organic film selected from the group consisting of polyolefin, polyarylene, polyester, polyimide, polyamide and polycarbonate.

4. The membrane structure as defined in claim 3, said organic film being poly (para-xylylene) formed by polymerizing para-xylylene monomer.

5. The membrane structure as defined in claim 3, said substrate being reinforced with a layer of mesh.

6. The membrane structure as defined in claim 3, said reflective coating being selected from the group consisting of aluminum, silver and gold.

7. The membrane structure as defined in claim 3, said infra-red emissivity increasing coating being a material selected from the group consisting of metals, metal oxides, mixtures of metals and metal oxides, metal sulfides, metal alloys and carbon.

8. The membrane structure as defined in claim 4, said substrate being reinforced with a layer of refractory mesh, said reflective coating being aluminum, and said infra-red emissivity increasing coating being a material selected from the group consisting of chromium, silicon monoxide, and mixtures thereof.

9. A thin lightweight membrane structure comprising a substrate consisting of a thin flexible organic film or metallic foil containing a reflective coating on one side of said substrate and an emissivity increasing coating on the opposite side of said substrate, said emissivity increasing coating being a material selected from the group consisting of chromium, silicon monoxide, lead, copper, tin, cobalt, iron, vanadium, copper oxide, chromium oxide, copper sulfide, lead sulfide, and mixtures thereof, nickel=iron=chrome alloys, and carbon.

10. A process for continuously producing thin lightweight membrane structures which comprises forming a thin continuous substrate in the form of a thin organic film or a metal foil, applying a reflective coating on one side of said substrate and applying an emissivity increasing coating on the opposite side of said substrate.

11. A process for continuously producing thin lightweight membrane structures which comprises forming a thin continuous substrate in the form of a thin organic film or a metal foil, applying a reflective coating on one side of said substrate and applying an infra-red emissivity increasing coating on the opposite side of said substrate.

12. The process as defined in claim 11, said forming said continuous substrate including etching said substrate to reduce its thickness.

13. The process as defined in claim 12, said etching being ion etching, and said substrate being a thin organic film or a metallic foil.

14. The process as defined in claim 11, said substrate being a thin organic film or a metallic foil.

15. The process as defined in claim 11, said substrate being a thin organic film selected from the group consisting of polyolefin, polyarylene, polyester, polyimide, polyamide and polycarbonate.

16. The process as defined in claim 15, said organic film being poly (para-xylylene) formed by polymerizing para-xylylene monomer on a cool surface.

17. The process as defined in claim 11, said substrate being an organic film containing a reinforcing material.

18. The process as defined in claim 11, said reflective coating being selected from the group consisting of aluminum, silver and gold.

19. The process as defined in claim 11, said infra-red emissivity increasing coating being a material selected from the group consisting of metals, metal oxides, mixtures of metals and metal oxides, metal sulfides, metal alloyes, and carbon.

20. The process as defined in claim 19, said infra-red emissivity increasing coating being a material selected from the group consisting of chromium, silicon monoxide, and mixtures thereof.

21. The process as defined in claim 19, said material also being colloidally dispersed in said substrate.

22. The process as defined in ·claim 11, including initially contacting a protective support film with one surface of said substrate, applying one of said reflective coating or said infra-red emissivity increasing coating on the opposite surface of said substrate, separating said protective support film from said substrate, applying the other of said reflective coating or said infra-red emissivity increasing coating to said one surface of said substrate, and again contacting said protective support film with said one surface or said opposite surface of said substrate adjacent said reflective coating or adjacent said infra-red emissivity increasing coating.

23. The process as defined in claim 11, including initially applying said reflective coating on a support member, applying one surface of said substrate over said reflective coating, and applying said infra-red emissivity increasing coating on the opposite surface of said substrate.

24. The process as defined in claim 22, wherein said support film is an acrylic resin, said substrate is polyimide film, said emissivity increasing coating is chromium and said reflective coating is aluminum.

25. A process for continuously producing thin lightweight membrane structures which comprises continuously passing a flexible organic or metallic substrate film around a rotating drum, ion etching said substrate as it passes around said drum, continuously applying an infra-red emissivity increasing coating on one side of said substrate film and continuously applying a reflective coating on the opposite side of said substrate film.

26. The process as defined in claim 25, said drum being a cooled drum mounted in a vacuum chamber, said ion etching taking place in said vacuum chamber.

27. The process as defined in claim 26, said infra-red emissivity increasing coating being applied by vaporizing an infra-red emissivity increasing material in a vacuum and depositing said vaporized material onto one side of said substrate film, said reflective coating being applied by vaporizing a reflective material in a vacuum and depositing said last mentioned vaporized material onto the opposite side of said substrate film.

28. The process as defined in claim 27, said substrate being an organic film selected from the group consisting of polyolefin, polyarylene, polyester, polyimide, polyamide and polycarbonate.

29. The process as defined in claim 28, said substrate being a polyarylene or a polyimide, said emissivity increasing material being a material selected from the group consisting of chromium, silicon monoxide, and mixtures thereof.

30. A process for continuously producing thin lightweight membrane structures which comprises continuously applying a film of a reflective coating on a rotating drum, exposing said rotating drum containing said reflective coating to para-xylylene monomer gas, causing said monomer gas to polymerize and form a polymer film over said reflective coating, and continuously applying an infra-red emissivity increasing coating to the opposite side of said polymer coating from said reflective coating, and peeling the resulting polymer film containing said reflective and said infra-red emissivity increasing coatings from said drum.

31. The process as defined in claim 30, said drum being maintained in a vacuum chamber, said reflective coating being aluminum, said reflective coating being applied by vaporizing aluminum and depositing the aluminum vapors on said drum, said infra-red emissivity increasing coating being chromium or silicone monoxide, said last mentioned coating being applied by vaporizing said infra-red emissivity increasing material in a vacuum and depositing said last mentioned vapors on said polymer film.

32. The process as defined in claim 31, said drum being cooled, and including continuously applying a reinforcing mesh over said polymer coating as it forms, to embed said mesh in said coating.

33. A process for continuously producing thin lightweight membrane structures which comprises continuously exposing a rotating cooled drum to para-xylylene monomer as, causing said monomer gas to polymerize and form a polymer film on the surface of said drum, continuously applying an infra-red emissivity increasing coating on one side of said polymer film, stripping said polymer film from said drum, and continuously applying a film of a reflective coating material on the opposite side of said polymer film.

34. The process as defined in claim 33, said cooled drum being maintained in a vacuum chamber, said infra-red emissivity increasing coating being chromium, silicon monoxide, or mixtures thereof, said last mentioned coating being applied by vaporizing an infra-red emissivity increasing material in a vacuum and depositing said vapors on one side of said polymer film, said reflective coating being aluminum, said last mentioned coating being applied by vaporizing aluminum in a vacuum and depositing the aluminum vapors on the opposite side of said polymer film.

35. The process as defined in claim 34, including continuously applying a reinforcing mesh over said polymer coating as it forms, to embed said mesh in said coating.

36. A process for producing thin lightweight membrane structures which comprises exposing a substrate to a monomer gas capable of polymerization, causing said monomer gas to polymerize and form a polymer film on said substrate, applying an infra-red emissivity increasing coating on one side of said polymer film, stripping said polymer film from said substrate, and applying a film of a reflective coating material on the opposite side of said polymer film.

37. The process as defined in claim 36, said monomer gas being para-xylylene monomer gas, said monomer gas being obtained by vaporizing and pyrolyzing di-para-xylylene, said monomer being deposited at substantially room temperature on said substrate to form poly(para-xylylene).

38. A process for continuously producing thin lightweight membrane structures which comprises forming a thin continuous substrate in the form of a thin organic film or a metal foil, applying a reflective coating on one side of said substrate and applying an emissivity increasing coating on the opposite side of said substrate, said emissivity increasing coating being a material selected from the group consisting of chromium, silicon monoxide, lead, copper, tin, cobalt, iron, vanadium, copper oxide, chromium oxide, copper sulfide, lead sulfide, and mixtures thereof, nickel=iron=chrome alloys, and carbon.

39. A process for producing thin lightweight membrane structures which comprises exposing a substrate to reactants capable of polymerizing to form a polyimide, causing said reactants to polymerize and form a polyimide film on said substrate, applying an infra-red emissivity increasing coating on one side of said polyimide film, stripping said polyimide film from said substrate, and applying a film of a reflective coating material on the opposite side of said polyimide film.

* * * * *